United States Patent Office 3,749,690
Patented July 31, 1973

---

3,749,690
AQUEOUS INTERPOLYMER EMULSIONS AND USE THEREOF IN LATEX PAINTS
Ralph F. Patella, South Plainfield, N.J., assignor to Celanese Corporation, New York, N.Y.
No Drawing. Filed Feb. 5, 1971, Ser. No. 113,107
Int. Cl. C09d 3/80, 5/02
U.S. Cl. 260—29.6 TA     7 Claims

ABSTRACT OF THE DISCLOSURE

An aqueous tetrapolymer emulsion derived from the interpolymerization of a short-chain alpha,beta-unsaturated mono- or polycarboxylic acid, acrylonitrile, a short-chain alpha,beta-unsaturated amide, and an alkyl acrylate, when combined with a pigment, provides a latex paint which, when applied to a surface and cured, forms a decorative coating exhibiting a high degree of burnish resistance, scrub resistance, ease of stain removal, and low temperature coalescence.

BACKGROUND OF THE INVENTION

This invention relates to latex paints and to polymer emulsions suitable for use in formulating latex paints. More particularly, the invention relates to aqueous polymer emulsions suitable for use in formulating latex paints which provide coatings of a high degree of performance.

Aqueous emulsions containing various homopolymers and copolymers (e.g., homopolymers and copolymers of vinyl esters, homopolymers and copolymers of lower alkyl acrylates such as ethyl acrylate and lower alkyl methacrylates such as methylmethacrylate, and the like) have been known for many years. Such polymer emulsions are generally prepared by adding, with rapid stirring or other suitable agitation, one or more ethylenically unsaturated monomers to water which contains or to which is added, either simultaneously or subsequently, a surfactant or emulsifying agent, a polymerization catalyst or initiator, and in many cases, a protective colloid. These mixtures are then heated to polymerization temperature with suitable agitation, and held at that temperature until substantially complete polymerization of the monomer or monomers has occurred. The resulting polymer emulsions, upon cooling and filtering, can be used in many domestic and industrial applications, such as in paints or other coating compositions (e.g., paper coatings and textile treating compositions), in adhesives or binders, in caulking compositions, and the like, depending on the nature of the particular polymer, and the properties of the emulsion containing such polymer.

With regard to paints and coating compositions in general, there has been considerable progress in recent years toward developing improved aqueous polymeric coating compositions. These so-called "water-base paints" or "latex paints" possess a number of advantages over the traditional oil-base paints. For example, latex paints are essentially odorless, nonflammable, and non-irritating to the skin. As a result, they are useful not only as household paints but also in industrial applications. With the advent of new polymers, aqueous polymeric coating compositions or latices have been developed which exhibit properties equal to or even superior to those possessed by some oil-base paints. For example, coatings derived from typical latex paints exhibit good adhesion to surfaces to which such paints are applied and also have excellent color retention under conditions of outdoor exposure.

Among the various aqueous polymer emulsions which are known to be useful in formulating water-base paints, acrylic polymer emulsions and particularly those which contain polymers derived from a predominant amount of a lower alkyl acrylate and minor amounts of other comonomers, e.g., alkyl methacrylates, higher alkyl acrylates, acrylic acid or methacrylic acid, vinyl halides, vinylidene halides, and the like, have come into ever-increasing use.

However, despite the great strides made in recent years, water-base paints still possess certain disadvantages which detract from their utility. In particular, such paints generally lack resistance to burnishing, poor stain-removal properties and poor low temperature coalescence. "Burnish resistance" is a desirable property which is lacking in most latex paints and particularly noticeable in "flat" interior wall paints. The term "burnish" refers to the glossy area remaining on a painted surface after washing or rubbing same with a damp cloth or brush. If the burnished area is large enough, it will be noticeable and will cause the entire painted surface to appear irregular. With respect to stain removal, the only method heretofore known for achieving a desirable level in this property is to sacrifice film integrity or "scrub resistance." That is to say, the stains are removed by mechanical erosion of the paint film. Hence, a latex paint with good stain removal generally exhibits poor "scrub" or "scrub resistance." The term "low temperature coalescence" refers to the covering power of a latex paint at the particular temperature at which it is applied to the surface to be painted. A latex paint is said to exhibit good low temperature coalescence when the individual globules of latex polymer coalesce or merge readily upon application of the latex paint to a surface at sub-ambient temperature. Surfaces treated with paints having poor low-temperature coalescence generally require multiple coats of paint.

Whereas latex paints are known which perform well with respect to one or possibly even two of the aforementioned properties, no paint has heretofore been found which performs well in all four categories.

Therefore, it is an object of the present invention to provide a latex paint having good burnish resistance, stain removal, scrub resistance, and low temperature coalescence.

Another object is to provide a process for producing a latex paint having good burnish resistance, stain removal, scrub resistance and low temperature coalescence within the context of acrylic polymer technology.

Yet another object is to provide a wall or surface coating from an acrylic latex paint having good burnish resistance, stain removal, scrub resistance, and low temperature coalescence.

These and other objects of the invention as well as the advantages thereof can be had by reference to the following detailed description and claims.

DESCRIPTION OF THE INVENTION

The above objects are achieved according to the present invention by a latex paint comprising a pigment and a vehicle, i.e., an aqueous polymer emulsion derived from the interpolymerization of a short-chain alpha,beta-unsaturated mono- or polycarboxylic acid, acrylonitrile, a short-chain alpha,beta-unsaturated amide, and an alkyl acrylate.

Desirably, and more particularly, the aqueous polymer emulsion paint vehicle of the present invention is a tetrapolymer emulsion derived from the interpolymerization of:

(a) A short-chain alpha,beta-unsaturated mono- or polycarboxylic acid, i.e., an alpha,beta-unsaturated carboxylic acid having the following formula:

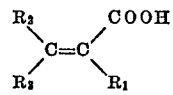

wherein $R_1$ is a hydrogen substituent, methyl substituent, or carboxymethyl substituent and $R_2$ and $R_3$ are each independently a hydrogen substituent or a carboxyl substituent, said carboxylic acid being further characterized in that $R_2$ and $R_3$ are not both carboxyl substituents;

(b) Acrylonitrile;

(c) Short-chain alpha,beta-unsaturated amide, i.e., an alpha,beta-unsaturated amide having the following formula:

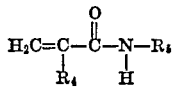

wherein $R_4$ is a hydrogen substituent or methyl substituent and $R_5$ is a hydroxymethyl substituent, an alkoxymethyl substituent wherein the alkyl moiety of said alkoxymethyl substituent contains between 1 and about 8 carbon atoms, or a substituent having the following structure:

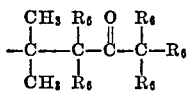

wherein $R_6$ is a hydrogen substituent or a hydroxymethyl substituent, with at least one of the $R_6$ substituents being a hydroxymethyl substituent; and (d) An alkyl acrylate wherein the alkyl substituent contains between 1 and about 8 carbon atoms.

Examples of alpha,beta-unsaturated mono- or polycarboxylic acids suitable for use in the present invention, i.e., component (a) of the tetrapolymer, include acrylic acid ($R_1=R_2=R_3=$—H), methacrylic acid ($R_1=$—$CH_3$;

$$R_2=R_3=\text{---H})$$

itaconic acid ($R_1=$—$CH_2COOH$; $R_2=R_3=$—H), maleic acid ($R_1=R_3=$—H; $R_2=$—COOH), fumaric acid $$(R_1=R_2=\text{---H}; R_3=\text{---COOH})$$

and the like. The amount or proportion of alpha,beta-unsaturated mono- or polycarboxylic acid employed in the present invention (including a single such acid or a plurality thereof) is desirably between about 0.25 percent by weight and about 5 percent by weight based on the total weight of the monomer components used to form the tetrapolymer. Preferably the amount of such acid or acids ranges between about 0.3 percent by weight and about 3 percent by weight, with between about 0.4 percent by weight and about 1 percent by weight of alpha,beta-unsaturated mono- or polycarboxylic acid or acids being especially preferred.

Examples of alpha,beta-unsaturated amides suitable for use in the present invention, i.e., component (c) of the tetrapolymer, include:

N-hydroxymethylacrylamide ($R_4=$—H; $R_5=$—$CH_3OH$),
N-hydroxymethylmethacrylamide ($R_4=$—$CH_3$; $R_5=$—$CH_3OH$),
N-methoxymethylacrylamide ($R_4=$—H; $R_5=$—$CH_2OCH_3$),
N-methoxymethylmethacrylamide ($R_4=$—$CH_3$; $R_5=$—$CH_2OCH_3$),
N-butoxymethylacrylamide ($R_4=$H; $R_5=$—$CH_2OCH_2(CH_2)_2CH_3$),
N-butoxymethylmethacrylamide ($R_4=$—$CH_3$; $R_5=$—$CH_2OCH_2(CH_2)_2CH_3$),
N-isopropoxymethylacrylamide ($R_4=$—H; $R_5=$—$CH_2OCH(CH_3)_2$),
N-isoamyloxymethylmethacrylamide ($R_4=$—$CH_3$; $R_5=$—$CH_2OCH_2$—$CH_3CH(CH_3)_2$),
N-octoxymethylacrylamide ($R_4=$—H; $R_5=$—$CH_2OCH_2$—$(CH_2)_6CH_3$), and the like.

Another example of an alpha,beta-unsaturated amide suitable for use in the present invention is the class of hydroxymethyl derivatives of diacetone acrylamide $$(R_4=\text{---H}; R_5=\text{---}C(CH_3)_2\text{---}C(R_6)_2\text{---}CO\text{---}C(R_6)_3)$$

which is commercially available from the Lubrizol Corporation under the trademark "HMDAA." The amount or proportion of alpha,beta-unsaturated amide employed in the present invention (including a single such amide or a plurality thereof) is desirably between about 0.5 percent by weight and about 3 percent by weight based on the total weight of the monomer components used to form the tetrapolymer. Preferably, the amount of alpha,beta-unsaturated amide or amides used ranges between about 1 percent by weight and about 2 percent by weight, with between about 1.25 percent by weight and about 1.75 percent by weight of alpha,beta-unsaturated amide being especially preferred.

Examples of alkyl acrylates suitable for use in the present invention, i.e., component (d) of the tetrapolymer, include methyl acrylate, ethyl acrylate, n-butyl acrylate, 2-ethylhexyl acrylate, and the like. The amount of alkyl acrylate used (including a single alkyl acrylate or a plurality thereof) must be greater than about 70 and less than 90 percent by weight based on the total weight of the monomer components used to form the tetrapolymer. Preferably the amount of alkyl acrylate or acrylates ranges between about 75 and about 88 percent by weight with between about 80 and about 88 percent by weight of alkyl acrylate being especially preferred.

The vehicle for the latex paint of the present invention is prepared in an aqueous menstruum under emulsion polymerization conditions. Any of a number of procedures heretofore known for effecting such emulsion polymerizations can be employed. It is a desideratum of the present invention, however, that the mode of polymerization be such as to result in latices having viscosities consistent with the use thereof in coatings applications. Accordingly polymerization techniques designed to elevate the viscosity of the finished latex (e.g., so-called "overpolymerization" of one or more viscosity-enhancing monomers over a "base polymer") are outside the scope of the present invention. Desirably, the procedure used involves the addition of one or more and preferably all, of the monomeric components to the reaction sphere in emulsified form. The reaction sphere to which the monomer "pre-emulsion" is added can contain a polymerization catalyst, one or more dispersing agents or emulsifying agents (hereinafter collectively referred to as "surfactants"), and the balance, if any, of the monomer charge, preferably in emulsified form. Optionally, the reaction sphere can contain one or more substances which serve to stabilize the finished aqueous polymer emulsion against undesirable grit formation, coagulation settling, and the like.

The polymerization temperature required to produce the aqueous paint vehicle of this invention will generally range from about room temperature to lower to about 100° C. or above. Preferably, the temperature employed will be between about 50° C. and about 70° C. and can, if desired, be varied within the aforementioned limits as the polymerization reaction proceeds toward completion. Subatmospheric pressures, atmospheric pressure or superatmospheric pressure can be employed during all or part of the polymerization process and, depending on the monomers and other ingredients employed in the reaction, can be carried out, if desired, under an inert atmosphere, e.g., under a nitrogen or carbon dioxide atmosphere. Thus, for example polymerizations carried out at temperatures within 10° C. of the boiling point of the lowest boiling monomer component are desirably conducted under an inert atmosphere.

The surfactants which can be used in the preparation of the instant paint vehicles include any anionic or non-ionic surfactant or plurality or combination thereof, which are employed in preparing conventional acrylic polymer emulsions. Preferably, the surfactant system is composed of a non-ionic surfactant or plurality thereof.

Among the non-ionic surfactants which can be used are polyethers, e.g., ethylene oxide and propylene oxide condensates in general, including straight-chain and branched-chain alkyl and alkylaryl polyethylene glycols and polypropylene glycol ethers and thioethers, and, more particularly, those substances known as Igepal surfactants, which is a trademark of General Aniline and Film Corporation denoting members of the homologous series of alkylphenoxypoly(ethyleneoxy)ethanols, which series can be represented by the general formula:

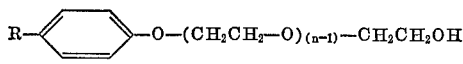

wherein R represents an alkyl substituent and $n$ represents the number of moles of ethylene oxide employed. These non-ionic surfactants include alkylphenoxypoly-(ethylenoxy)ethanols having alkyl substituents containing between about 4 and about 20 carbon atoms, and having between about 10 and about 240 ethyleneoxy units, included among which are alkylphenoxypoly(ethyleneoxy) ethanols having alkyl groups containing from about 7 to about 18 carbon atoms, and having from about 10 to about 150 ethyleneoxy units, such as the heptylphenoxypoly(ethyleneoxy)ethanols, nonylphenoxypoly(ethyleneoxy)ethanols and dodecylphenoxypoly(ethyleneoxy)ethanols. Other suitable non-ionic surfactants are the Tween surfactants, which is a trademark of Atlas Powder Company denoting polyoxyalkylene derivatives of hexitol (including sorbitans, sorbides, mannitans and mannides) anhydride, partial esters of long-chain fatty acids such as the polyoxyalkylene derivatives of sorbitan monolaurate, sorbitan monopalmitate, sorbitan monostearate, sorbitan tristearate, sorbitan monolaurate, sorbitan trilaurate, sorbitan mono-oleate, and sorbitan trioleate. Other classes of suitable non-ionic surfactants are the Pluronic surfactants, which is a trademark of Wyandotte Chemicals Corporation denoting condensates of ethylene oxide with a hydrophobic base, said base being formed by condensing propylene oxide with propylene glycol; sulfur-containing condensates, e.g., those prepared by condensing ethylene oxide with higher alkyl mercaptans, such as nonyl mercaptan, dodecyl mercaptan, or tetradecyl mercaptan, or with alkylthiophenols wherein the alkyl group contains from 6 to 15 carbons atoms; ethylene oxide derivatives of long-chain carboxylic acids such as lauric acid, myristic acid, or oleic acid, or mixtures of acids such as tall oil; and ethylene oxide derivatives of long-chain alcohols such as octyl alcohol, decyl alcohol, lauryl alcohol, or cetyl alcohol.

Among the anionic surfactants which can be used are the higher molecular weight sulfates and sulfonates, e.g., sodium and potassium alkyl, aryl, and alkylaryl sulfates and sulfonates such as sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzenesulfonate, potassium methylbenzenesulfonate, sodium dodecylbenzenesulfonate, potassium toluenesulfonate and sodium xylenesulfonate; higher fatty alcohols, e.g., stearyl alcohol, lauryl alcohol, and the like, which have been ethoxylated and sulfonated; dialkyl esters of alkali metal sulfosuccinic acid salts, such as sodium diamyl sulfosuccinate; and formaldehyde/napthalenesulfonic acid condensation products.

The total amount of surfactant employed in the emulsion polymerization process will range from about 1 percent by weight to about 10 percent by weight, based on the total weight of the monomer charge, and this can be the case whether a non-ionic or anionic surfactant is employed. However, it is preferred when using typical non-ionic surfactants, e.g., those of the above-described alkylphenoxypoly(ethyleneoxy)ethanols, which contain from about 4 to about 240 ethyleneoxy units, or typical anionic surfactants, e.g., an ethoxylated higher fatty alcohol which has also been sulfonated, to employ them in amounts ranging from about 1.5 percent by weight to about 6 percent by weight, based on the total weight of the monomer charge.

Aside from the surfactant mixture employed the reaction sphere can also contain small amounts of one or more "protective colloids," particularly when a reflux-type polymerization procedure is employed. Included among such materials are ether linkage-containing protective colloids such as hydroxymethyl cellulose, hydroxyethyl cellulose, ethylhydroxy-ethyl cellulose, carboxymethyl cellulose, ethoxylated starch derivatives, and the like. However, other proteive colloid-forming substances, i.e., those containing no ether linkages, can also be used either alone or in combination with the aforementioned ether linkage-containing materials. Included among these non-ether linkage-containing colloids are partially and fully hydrolyzed polyvinyl alcohols, polyacrylic acid, alkali metal polyacrylates (eg., sodium polyacrylates) polyacrylamide, poly (methylvinyl ether/maleic anhydride), polyvinylpyrrolidone, water-soluble starch, glue, gelatin, water-soluble alginates such as sodium alginate or potassium alginate, casein, agar, and natural and synthetic gums, such as gum arabic and gum tragacanth. All of these materials can be used in amounts usually ranging from about 0.1 percent by weight to about 2 percent by weight, based on the total weight of the monomer charge.

The monomeric components of the instant polymer latex are polymerized by means of catalytically effective amounts of one or more conventional free radical polymerization catalysts or catalyst systems (which can also be referred to as addition polymerization catalysts, vinyl polymerization catalysts or polymerization initiators). Preferably, the polymerization catalyst is substantially water-soluble. Among such catalysts are inorganic peroxides such as hydrogen peroxide, alkali metal persulfates (e.g., sodium persulfate, potassium persulfate, or alkali metal perborate), azonitrile such as azobisisobutyronitrile, and redox systems, including such combinations as mixtures of hydrogen peroxide, t-butyl hydroperoxide, and the like, and any of an iron salt, a titanous salt, zinc formaldehyde sulfoxylate or sodium formaldehyde sulfoxylate; alkali metal persulfate or ammonium persulfate, perborate, or perchlorate, together with an alkali metal bisulfite such as sodium metabisulfite; and an alkali metal persulfate together with an arylphosphinic acid such as benzenephosphinic acid, and the like.

In accordance with conventional practice, the amount of polymerization catalyst employed is generally no more than that required to obtain substantially complete monomer conversion at lowest catalyst cost. Thus, for example, there can be employed from about 0.3 percent by weight to about 0.5 percent by weight of a perchlorate such as ammonium perchlorate, together with an approximately equal amount of a bisulfite such as sodium metabisulfite, and preferably about 0.4 percent by weight of the perchlorate together with about 0.4 percent by weight of the bisulfite, each of these weight percentages being based on the total weight of the monomer charge.

It is also possible, when using a redox catalyst system, to dissolve the oxidant, e.g., ammonium persulfate, in the surfactant-water mixture constituting the original reaction sphere prior to the addition of the monomer pre-emulsion. Thereafter, the reductant together with the monomer pre-emulsion (which can likewise contain dissolved oxidant), can be added to the reaction sphere in separate aqueous streams.

The amounts of water used to form the reaction sphere, monomer pre-emulsion and catalyst solutions are generally determined by the solids content desired in the finished polymer emulsion. The solids content can range from as low as 20 percent by weight to as high as 70 percent by weight or higher, based on the total weight of the emulsion.

The tetrapolymer latices as produced generally have a pH in the acid range. Although these acidic latices can be formulated into paints, better results are obtained by adjusting the pH to at least 6.8 and desirably to a pH greater than 7. For example, undesirable corrosion of metallic substrates and containers ("can corrosion") can be suppressed by simply imparting an alkaline pH to the latex. Especially preferred is a latex having a pH between about 7 and about 10. Materials suitable for use in adjusting the pH to the desired value generally include any alkaline material which does not form a strong electrolyte. Examples of suitable materials include metal hydroxides, e.g., potassium hydroxide; and amines e.g., ammonia, piperidine, dimethylaniline, morpholine, mono-, di-, and triethanolamine and n-butylamine. Ammonium hydroxide (aqueous ammonia) is especially preferred for adjusting the latex pH because of its low cost and high volatility (i.e., during the curing of the latex paint, ammonia is released from the ammonium carboxylate sites along the polymer chains).

It is a principal feature of the present invention that tetrapolymer latices of the type described hereinabove can be used to formulate water-base paints having extraordinarily good performance properties. The formulation procedure used can be any of those heretofore known in the latex paint formulation art. Essentially, the water-base paints of the present invention comprise an admixture of pigmentary material (including primary pigments and extender pigments) and latex. The pigmentary material is preferably utilized in conventionally suitable comminuted form as are all of the other optional solid adjuvants described hereinbelow.

In combining the paint constituents to formulate a latex paint of the present invention, one or more primary pigments, extender pigments and other adjuvants (which may themselves be liquid or solid), if any, can be incorporated into the tetrapolymer latex binder to form a smooth, uniform mixture simply by adding all the materials to a vessel with stirring. While it is possible to combine pigments and the like with the tetrapolymer emulsion and to grind or otherwise triturate the mixture in a mill, it is desirable to first prepare an aqueous paste of pigment and adjuvants, preferably with the aid of a dispersing agent, in a high-shear mixer and then combine the paste with the latex. The consistency of the paste can be controlled by the relative amounts of water and pigments and adjuvants used.

Pigmentary materials suitable for use in formulating the water-base paints of the present invention include (but are not limited to) conventional pigmentary materials or color bodies such as titanium oxide, carbon black, cadmium sulfide, cadmium selenide, copper phthalocyanine, zinc oxide, zinc sulfide, iron oxide, chromium oxide, and the like. The proportion of pigment or pigments used in formulating a water-base paint of the present invention is expressed herein in terms of "pigment volume concentration," PVC according to the following relationship.

$$PVC = \frac{\text{Volume of Pigmentary Material}}{\text{Volume of Pigmentary Material} + \text{Volume of Latex Solids}} \times 100$$

The choice of a particular pigment volume concentration is determined by a number of factors, including the desired depth of color, covering power, and the like. Generally, the water-base paints of the present invention can have pigment volume concentrations ranging from about 20 percent or less up to about 75 percent. Preferably, these water-base paints have pigment volume concentrations of between about 45 percent and about 70 percent.

In addition to pigmentary materials, one or more various adjuvants can, if desired, be included in the formulation of the water-base paints of the present invention. Such adjuvants include (but are not limited to) dispersing and emulsifying agents; thickeners; sizing agents; fillers (i.e. "extender pigments"); coalescing agents; antifreeze agents; filming agents; protective colloids; and the like. The selection of particular adjuvants and the relative amounts thereof are generally governed by the properties desired in a particular water-base paint and will be apparent to those skilled in the art. In general however, the latex paints of the present invention will have total solids contents between about 40 and about 65 weight percent.

The water-base paints of the present invention can be applied to a wall surface or substrate surface in any conventional manner, e.g., by brush, roller, spraying, and the like. The paint can be cured or dried after application to the substrate, likewise by conventional means, e.g., air drying, baking, and the like. The cured paint coating exhibits excellent performance with regard to burnish resistance, scrub resistance, stain removal and low temperature coalescence. In addition, surfaces coated with the latex paints of the present invention perform well with regard to enamel holdout and contrast ratio (i.e., hiding power). These properties are further defined and illustrated in connection with the following description of the preferred embodiments.

DESCRIPTION OF THE PREFERRED EMBODIMENTS

The following examples are presented for the purpose of illustrating (but not limiting) the present invention. In the examples:

Parts and percentages are by weight unless otherwise indicated.

Scrub resistance is determined according to a modified version of ASTM D–2486–66T. The test paint is drawn down the length of a black plastic (Laneta) panel using a 7 milliliter applicator and the resulting film is allowed to dry for 7 days at 77° F. and 50% relative humidity. The test panel is placed on the shim plate and fastened with masking tape around the perimeter. The shim plate is then placed in the pan holder of the washability tester. An amount (5.0 grams) of Bon Ami abrasive is placed directly on a wet nylon brush (which had been immersed in distilled water overnight), and the brush mounted on the test panel with a 1-pound weight attached to the top of the brush holder. The washability tester is started, and, after every 300 cycles, the brush is rewetted and an additional 5 grams of abrasive is added thereto. Two panels are tested for each paint sample. Readings (number of cycles) are taken at the complete break of the paint film across the width of the shim. Scrub resistance is determined by averaging the two readings (one reading for each panel).

Burnish resistance is determined by visual examination of the panels during the scrub resistance test procedure.

Stain removal is determined using the films prepared in connection with the scrub resistance test, supra. The following stains are applied to the panels 0.5 hour prior to testing: Blaisdell red china marking pencil (2½ hardness); red crayon; and house dust. The test panels are subjected to the scrub resistance test procedure and the number of cycles required to remove each stain is recorded.

Viscosity is determined by means of a Stormer viscometer equipped with a paddle-type rotor. The paint to be tested is stirred thoroughly and placed in a cylindrical container having an inside diameter of at least 3 inches. The temperature of the paint sample is maintained at 75°+3° F. This is the temperature at which the results in column 3 of Table I are obtained. The results shown in columns 4 and 5 of Table I were obtained at 120° F. The paddle rotor is rotated in the paint sample for at least 10 cycles. The time required for an additional 100 cycles is then measured. The weights selected are those which will result in a time of 27 to 33 seconds for the 100 cycles. The viscosity in Krebs units is determined from the table accompanying the Stormer viscometer.

Enamel holdout is determined by means of the following procedure. A film of the paint to be tested is applied over the unsealed section of an all-white Morest chart (Form HC) using a 6-inch wide Bird applicator. The resulting film (thickness: 1.5–2.0 mils) is allowed to dry for 24 hours. Next, a commercially available semi-gloss composition ("Dulamel," produced by Benjamin Moore & Co.) is applied over the entire length of the Morest chart using the applicator adjusted to give a dry film thickness of approximately 1.5 mils. The film thus applied is allowed to dry for 16 to 24 hours. The degree of gloss over the test paint and over the sealed surface are measured at 60° F. using a vacuum plate to produce a flat surface. The enamel holdout rating (sealing efficiency), in percent, is determined from the following formula:

Enamel Holdout (percent)
$$= \frac{\text{Gloss over test paint}}{\text{Gloss over sealed area}} \times 100$$

Contrast ratio is determined by means of the following procedure. A 0.003 inch film of the paint to be tested is applied over a half white, half black Morest chart (Form 010 P) using a Bird applicator. The resulting paint film is allowed to dry for at least 16 hours. The reflectance of the test paint film over the white and black sections of the Morest chart is measured using a Photovolt model 610 photoelectric reflectometer equipped with a 610 Y search unit. The apparatus is allowed to warm up for at least 15 minutes and then, using the green filter, it is standardized at 0 with the instrument off and at the standardized reflectance (approximately 75) using the white enamel working standard (Catalog No. 6162). The values for contrast ratio in percent, are obtained using the following formula:

$$\text{Contrast ratio (percent)} = \frac{\text{Reflectance over black}}{\text{Reflectance over white}} \times 100$$

Low temperature coalescence is determined as follows. The test paint, unsealed carboard test panel, and applicator brush are conditioned in a refrigerator overnight at 40° F. Upon removal, the unsealed cardboard is immediately painted with the test paint and replaced in the refrigerator to dry for approximately 4 hours while the brush and test paint are allowed to warm up to ambient temperature. Upon completion of the 4-hour drying period, the test panel is removed from the refrigerator and allowed to warm up to ambient temperature. The test paint (now at ambient temperature) is re-applied over the test panel in the form of an "X." Upon re-drying at ambient temperature, the test panel is inspected visually. In the case of the paints having good low temperature coalescence, the "X" should be undiscernible except for the slight angular sheen difference which is common to all latex paints.

Solids contents are determined gravimetrically.

EXAMPLE I

This example describes the preparation of a latex paint according to the present invention wherein the paint vehicle is a tetrapolymer emulsion derived from methacrylic acid, acrylonitrile, N-methylolacrylamide, and ethyl acrylate.

First, a monomer "pre-emulsion" is prepared from the following ingredients:

| Ingredient: | Parts |
|---|---|
| Water | 70.0 |
| Methacrylic acid | 2.0 |
| Acrylonitrile | 64.0 |
| N-methylolacrylamide (60% aqueous solution) | 14.2 |
| Ethyl acrylate | 496.0 |
| Igepal CO–897 | 37.1 |
| Igepal CO–530 | 13.1 |
| Total | 698.8 |

The water, aqueous N-methylolacrylamide, Igepal CO–897 and Igepal CO–530 are charged to a suitable container equipped with mechanical agitation means. To this mixture is added a mixture composed of the methacrylic acid, acrylonitrile, and ethyl acrylate. This addition is performed slowly and continuously at ambient temperature. Agitation is maintained throughout the addition and thereafter until emulsification is complete as evidenced by the formation of an opaque homogeneous mixture.

The tetrapolymer emulsion is next prepared from the following ingredients:

| Ingredient: | Parts |
|---|---|
| Monomer pre-emulsion | 696.8 |
| Sodium persulfate | 1.0 |
| Sodium metabisulfite | 1.0 |
| Water | 400.0 |

To a reaction sphere comprising initially a moderately agitated solution of sodium persulfate (1.0 part) and sodium metabisulfite (1.0 part) in water (200.0 parts) are added continuously and concurrently the monomer pre-emulsion, a catalyst solution of sodium persulfate (1.0 part) in water (50.0 parts), and a catalyst solution of sodium metabisulfite (1.0 part) in water (50.0 parts). The pre-emulsion is added over a period of 4 hours while the catalyst solutions are both added over a period of 4 hours 10 minutes, all three additions being commenced at the same time. A temperature of 60° C. is maintained within the reaction sphere throughout the additions. At the completion of the addition of the catalyst solutions, another solution of sodium persulfate (1.0 part) in water (50.0 parts) and another solution of sodium metabisulfite (1.0 part) in water (50.0 parts) are added to the reaction sphere continuously and concurrently over a period of 10 minutes. When these additions are complete, the reaction sphere is maintained at a temperature of 60° C. for an additional ½ hour and is then cooled to ambient temperature. Finally, the pH of the resultant latex is adjusted to a value of 6.2 by the addition of a suitable quantity of 15 percent aqueous ammonia. The resulting latex has a solids content of 60 percent.

A water-base paint is formulated from the above-prepared latex by first mixing the following ingredients, in the order indicated, within a suitable vessel:

| Ingredient | Pounds | Gallons |
|---|---|---|
| 2% aqueous solution of Methocel 65 HG (a trademark of Dow Chemical Co. denoting a water soluble methyl cellulose) | 155 | 18.5 |
| Potassium tripolyphosphate | 1 | |
| Propylene glycol | 25 | 2.9 |
| Tamol 731 (a trademark of Rohm & Haas Co. denoting a 25% aqueous solution of the sodium salt of a carboxylated polyelectrolyte) | 2 | 0.4 |
| R & R 551 (a trademark of Ross & Rowe, Inc. denoting a water-dispersible lecithin) | 2.0 | 0.2 |
| PMA 18 (a trademark of Troy Chemical denoting an 18 percent aqueous solution of phenyl mercuric acetate) | 0.3 | |
| Rutile (pigment grade titanium dioxide) | 190 | 5.4 |
| Iceberg (a trademark of Thompson, Weinmann, & Co. denoting an aluminosilicate pigment) | 100 | 4.6 |
| Celite 281 (a trademark of Johns Manville Co. denoting diatomaceous earth filler) | 25 | 1.3 |
| Snowflake White (a trademark of Thompson, Weinmann, & Co. denoting a calcium carbonate whiting filler) | 125 | 5.5 |
| Napco NDW (a trademark of Napco Chemical Co. denoting a silicone defoaming agent) | 2 | 0.2 |
| Water (added incrementally during pigment addition to maintain a heavy paste) | 130 | 15.6 |
| Carbitol Acetate (a trademark of Union Carbide Corp. denoting diethylene glycol monoethyl ether acetate coalescing agent) | 8 | 0.9 |
| Total | 767.3 | 55.5 |

The resulting mixture is stirred until uniform, dispersed in a Cowles dissolver, and let down with the following ingredients:

| Ingredient | Pounds | Gallons |
|---|---|---|
| Water | 120 | 14.4 |
| 2% aqueous solution of Methocel 65 HG | 50 | 6.0 |
| Tetrapolymer emulsion | 240 | 24.4 |
| Total | 390 | 44.4 |

The resulting latex paint has the following physical properties:

Density (pounds/gallon) .................... 11.0
Pigment volume concentration (PVC) ........ 56
Solids content (weight percent) ............ 50.2
pH ......................................... 8.0–9.0
Viscosity (Krebs units, K.U.) .............. 80–90

The performance properties of this latex paint are summarized in Table I, hereinbelow.

EXAMPLE II

The procedure employed in this example is identical to that used in Example 1, except that a hydroxymethyl derivative of diacetone acrylamide (sold by the Lubrizol Corporation under the trademark "HMDAA") is substituted for N-methylolacrylamide. Thus, a monomer pre-emulsion is first prepared from the following ingredients:

Ingredient: | Parts
--- | ---
Water | 70.0
Methacrylic acid | 2.0
Acrylonitrile | 64.0
Lubrizol HMDAA (55% aqueous solution) | 15.5
Ethyl acrylate | 496.0
Igepal CO–897 | 37.1
Igepal CO–530 | 13.1
Total | 697.7

The performance properties of the resulting latex paint are summarized in Table I, hereinbelow.

EXAMPLE III

This example illustrates a variant of the procedure employed in Example I to produce a tetrapolymer emulsion suitable for use in formulating a latex paint according to the present invention.

The monomer pre-emulsion is prepared in the manner of Example I from the following ingredients:

Ingredient: | Parts
--- | ---
Water | 53.0
Methacrylic acid | 1.8
Acrylonitrile | 48.5
N-methylolacrylamide (60% aqueous solution) | 10.7
Ethyl acrylate | 375.0
Igepal CO–897 | 28.5
Igepal CO–530 | 10.0
Total | 527.5

The tetrapolymer emulsion is next prepared in the manner of Example I from the following ingredients:

Ingredient: | Parts
--- | ---
Monomer pre-emulsion | 527.5
Sodium persulfate | 0.8
Sodium metabisulfate | 0.8
Water | 467.7

To a moderately agitated solution of 0.8 part each of sodium persulfate and sodium metabisulfate in 347.7 parts of water at 60° C. are added continuously and concurrently the monomer pre-emulsion, a catalyst solution of sodium persulfate (0.8 part) in water (50.0 parts), and a catalyst solution of sodium metabisulfate (0.8 part) in water (50.0 parts). The rates of addition and reaction temperature are the same as in Example I. Upon the completion of the additions, another solution of sodium persulfate (0.8 part) in water (10.0 parts) and another solution of sodium metabisulfite (0.8 part) in water (10.0 parts) are added to the reaction mixture continuously and concurrently over a period of 10 minutes at 60° C. When these additions are complete the reaction system is maintained at a temperature of 60° C. for an additional ½ hour and then cooled to room temperature. Finally the pH of the resulting latex is adjusted to a value of 6.2 in the manner indicated in Example I. The latex has a solids content of 46 percent.

Three water-base paints, each with a different pigment volume concentration (PVC), are formulated from the tetrapolymer latex produced above in this example by first mixing the following ingredients, in the order indicated within a suitable vessel:

| Ingredient | Pounds | Gallons |
| --- | --- | --- |
| 1.25% aqueous solution of Natrosol 250 HR (a trademark of Hercules Powder Co. denoting a water-soluble hydroxyethyl cellulose polymer) | 155 | 18.5 |
| Potassium tripolyphosphate | 1 | |
| Propylene glycol | 25 | 2.9 |
| Tamol 731 | 4 | 0.4 |
| R & R 551 | 2 | 0.2 |
| PMA 18 | 0.3 | |
| Rutile | 190 | 5.4 |
| Iceberg | 100 | 4.6 |
| Snowflake White | 125 | 5.5 |
| Celite 281 | 25 | 1.3 |
| Napco NDW | 2 | 0.2 |
| Water (added incrementally during pigment addition to maintain a heavy paste) | 13 | 1.6 |
| Carbitol acetate | 8 | 0.9 |
| Total | 650.3 | 41.5 |

The resulting mixture is stirred until uniform, dispersed in a Cowles dissolver, and letdown with the following ingredients:

| Ingredient | Pounds | Gallons |
| --- | --- | --- |
| Water and/or a 1.25% aqueous solution of Natrosol 250 HR (for viscosity adjustments) | 267 | 32.0 |
| Tetrapolymer emulsion: | | |
| For 50 PVC | 358 | 38.4 |
| For 60 PVC | 237 | 25.4 |
| For 70 PVC | 152 | 16.2 |

The resulting latex paints have the following physical properties:

Pigment volume concentrations (PVC) .. 50, 60, or 70
Density (pounds/gallon) .................... 11.0
Solids content (weight percent) ............ 50.2
pH ......................................... 8.0–9.0
Viscosity (Krebs units, K.U.) .............. 80–90

The performance properties of these latex paints are summarized in Table I, below.

EXAMPLE IV

The procedure employed in this example is identical to that used in Example III, except that Lubrizol HMDAA is substituted for N-methylolacrylamide. Thus, the monomer pre-emulsion is first prepared in the manner of Example I from the following ingredients:

Ingredient: | Parts
--- | ---
Water | 53.0
Methacrylic acid | 1.8
Acrylonitrile | 48.5
Lubrizol HMDAA (55% aqueous solution) | 11.7
Ethyl acrylate | 375.0
Igepal CO–897 | 28.5
Igepal CO–530 | 10.0
Total | 528.5

The performance properties of the resulting latex paints are summarized in Table I, below:

TABLE I.—LATEX PAINT EVALUATION

| Ex. | PVC | Viscosity (K.U.) | | | Scrub resist. (cycles) | Percent | | | Low temperature coalescence | Burnish resistance | Stain removal (strokes) | | | |
|---|---|---|---|---|---|---|---|---|---|---|---|---|---|---|
| | | Initial | 1 week at 120° F. | 3 weeks at 120° F. | | Enamel holdout | Contrast ratio | | | | China marking | Pencil | Crayon | House dust |
| I | 56 | 83 | 81 | 82 | 2,610 | 70.1 | 96.7 | Excellent | Excellent | 35 | 15 | 15 | 20 |
| II | 56 | 83 | 81 | 82 | 2,600 | 70.1 | 97.0 | ___do___ | ___do___ | 35 | 15 | 15 | 20 |
| III | 50 | 79 | 67 | 65 | 2,675 | 61.0 | 97.2 | Very good | Very good | 32 | 15 | 15 | 15 |
| III | 60 | 84 | 72 | 69 | 865 | 57.0 | 95.1 | ___do___ | ___do___ | 40 | 12 | 12 | 20 |
| III | 70 | 89 | 69 | 69 | 130 | 40.6 | 96.5 | Excellent | Good | 32 | 8 | 12 | 15 |
| IV | 50 | 80 | 67 | 65 | 1,950 | 60.0 | 97.2 | ___do___ | Very good | 32 | 15 | 15 | 15 |
| IV | 60 | 85 | 73 | 70 | 865 | 57.0 | 95.1 | ___do___ | ___do___ | 40 | 12 | 12 | 20 |
| IV | 70 | 90 | 70 | 69 | 130 | 40.6 | 96.5 | ___do___ | ___do___ | 32 | 8 | 12 | 15 |

I claim:

1. A latex paint comprising a pigmentary material and an aqueous polymer emulsion, said emulsion being derived from the interpolymerization of a monomer charge comprising:
(a) between about 0.3 percent by weight and about 3 percent by weight based on the total weight of the monomer charge of an alpha,beta-unsaturated carboxylic acid having the following formula:

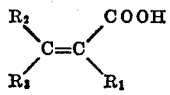

wherein $R_1$ is a hydrogen substituent, methyl substituent, or carboxymethyl substituent and $R_2$ and $R_3$ are each independently a hydrogen substituent or a carboxyl substituent, said carboxylic acid being further characterized in that $R_2$ and $R_3$ are not both carboxyl substituents;
(b) between about 10 percent by weight and about 20 percent by weight based on the total weight of the monomer charge of acrylonitrile;
(c) between about 1 percent by weight and about 2 percent by weight based on the total weight of the monomer charge of an alpha,beta-unsaturated amide having the following formula:

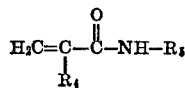

wherein $R_4$ is a hydrogen substituent or methyl substituent and $R_5$ is a hydroxymethyl substituent, an alkoxymethyl substituent wherein the alkyl moiety of said alkoxymethyl substituent contains between 1 and about 8 carbon atoms; or a substituent having the following structure:

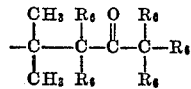

wherein $R_6$ is a hydrogen substituent or a hydroxymethyl substituent with at least one of the $R_6$ substituents being a hydroxymethyl substituent; and
(d) between about 75 percent by weight and about 88 percent by weight based on the total weight of the monomer charge of an alkyl acrylate wherein the alkyl substituent contains between 1 and about 8 carbon atoms.

2. A latex paint according to claim 1 wherein:
the alpha,beta-unsaturated carboxylic acid component (a) is acrylic acid, methacrylic acid, itaconic acid, maleic acid or fumaric acid;
the alpha,beta-unsaturated amide component (c) is N-methylolacrylamide, N - methoxymethylacrylamide, N-methylolmethacrylamide, N-methoxymethylacrylamide, or a hydroxymethyl derivative of diacetone acrylamide;
the alkyl acrylate component (d) is methyl acrylate, ethyl acrylate, n-propyl acrylate, iso-propyl acrylate, n-butyl acrylate or 2-ethylhexyl acrylate.

3. A latex paint according to claim 2 wherein:
the alpha,beta-unsaturated carboxylic acid component (a) is methacrylic acid and constitutes between about 0.4 percent by weight and about 1 percent by weight of the monomer charge;
the acrylonitrile component (b) constitutes between about 10 percent by weight and about 12 percent by weight of the monomer charge;
the alpha,beta-unsaturated amide component (c) is N-methylolacrylamide or a hydroxymethyl derivative of diacetone acrylamide and constitutes between about 1.25 percent by weight and about 1.75 percent by weight of the monomer charge; and
the alkyl acrylate component (d) is ethyl acrylate and constitutes between about 80 percent by weight and about 88 percent by weight of the monomer charge.

4. A surface coating formed by:
(1) applying to the surface a latex paint comprising a pigmentary material and an aqueous polymer emulsion derived from the interpolymerization of a monomer charge comprising:
(a) between about 0.3 percent by weight and about 3 percent by weight based on the total weight of the monomer charge of an alpha-beta-unsaturated carboxylic acid having the following formula:

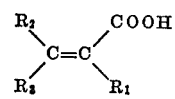

wherein $R_1$ is a hydrogen substituent, methyl substituent, or carboxymethyl substituent and $R_2$ and $R_3$ are each independently a hydrogen substituent or a carboxyl substituent, said carboxylic acid being further characterized in that $R_2$ and $R_3$ are not both carboxyl substituents;
(b) between about 10 percent by weight and about 20 percent by weight based on the total weight of the monomer charge of acrylonitrile;
(c) between about 1 percent by weight and about 2 percent by weight based on the total weight of the monomer charge of an alpha,beta-unsaturated amide having the following formula:

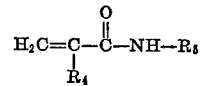

wherein $R_4$ is a hydrogen substituent or methyl substituent and $R_5$ is a hydroxymethyl substituent, an alkoxymethyl substituent wherein the alkyl moiety of said alkoxymethyl substituent contains between 1 and about 8 carbon atoms, or a substituent having the following structure:

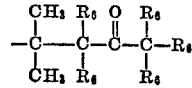

wherein $R_6$ is a hydrogen substituent or a hydroxymethyl substituent with at least one of the $R_6$ substituents being a hydroxymethyl substituent; and
(d) between about 75 percent by weight and about 88 percent by weight based on the total weight of the monomer charge of an alkyl acrylate wherein the alkyl substituent contains between 1 and about 8 carbon atoms; and
(2) curing the latex paint applied in step (1).

5. A method according to claim 4 wherein:
the alpha,beta-unsaturated carboxylic acid component (a) is acrylic acid, methacrylic acid, itaconic acid, maleic acid or fumaric acid;
the alpha,beta-unsaturated amide component (c) is N-methylolacrylamide, N - methoxymethylacrylamide, N-methylolmethacrylamide, N-methoxymethylmethacrylamide, or a hydroxymethyl derivative of diacetone acrylamide;
the alkyl acrylate component (d) is methyl acrylate, ethyl acrylate, n-propyl acrylate, iso-propyl acrylate, n-butyl acrylate or 2-ethylhexyl acrylate.

6. A method according to claim 5 wherein:
the alpha,beta-unsaturated carboxylic acid component (a) is methacrylic acid and constitutes between about 0.4 percent by weight and about 1 percent by weight of the monomer charge;
the acrylonitrile component (b) constitutes between about 10 percent by weight and about 12 percent by weight of the monomer charge;
the alpha,beta-unsaturated amide component (c) is N-methylolacrylamide or a hydroxymethyl derivative of diacetone acrylamide and constitutes between about 1.25 percent by weight and about 1.75 percent by weight of the monomer charge; and
the alkyl acrylate component (d) is ethyl acrylate and constitutes between about 80 percent by weight and about 88 percent by weight of the monomer charge.

7. An object coated by the composition of claim 1.

References Cited
UNITED STATES PATENTS 3,231,533  1/1966  Garrett et al. ____ 260—29.6 TA
3,240,740  3/1966  Knapp et al. ____ 260—29.6 TA WILLIAM H. SHORT, Primary Examiner L. M. PHYNES, Assistant Examiner U.S. Cl. X.R.

117—161 UT; 260—8, 17 R, 17.4 ST, 41 B